Patented Feb. 8, 1944

2,340,935

UNITED STATES PATENT OFFICE 2,340,935

METHOD OF PREPARING CONTACT AGENTS

Gerald C. Connolly, Baton Rouge, La., assignor to Standard Oil Development Company, a corporation of Delaware No Drawing. Application December 11, 1940, Serial No. 369,565

8 Claims. (Cl. 252—236)

This invention relates to methods of preparing improved contact agents, such as adsorbents, catalysts, and catalyst carriers.

Certain metal oxides, especially those of an amphoteric type such as alumina, chromium oxide and iron oxide are known to have adsorbent and catalytic properties. Their adsorbent properties are useful in various types of processes, e. g., refining and decolorization, dehydration of liquids and removal of water vapor or solvents from gases. Their catalytic properties are particularly useful in processes for treating hydrocarbon oils such as catalytic cracking, catalytic reforming, catalytic dehydrogenation, destructive hydrogenation, hydrogenation, catalytic cracking in the presence of hydrogen and catalytic reforming in the presence of hydrogen. Their properties as catalyst carriers are useful in many catalytic processes such as those already mentioned in which other highly active materials are incorporated with or deposited on them.

The extent to which the desirable adsorbent and catalytic properties of these oxides is manifested is believed to depend primarily upon the physical structure and surface characteristics thereof. It is known, for example, that certain forms of the oxides exhibit substantial adsorbent and catalytic properties whereas other forms of these same oxides have little or no value for these purposes.

Aluminum oxide is the most readily available and widely used oxide of this type. Heretofore it has been found that "activated alumina" and "peptized alumina gel" have marked adsorbent and catalytic properties. "Activated alumina" is the term applied to a highly adsorptive, partially dehydrated aluminum trihydrate containing approximately 91% $Al_2O_3$, the remainder being essentially water and a small amount of alkali. It is deposited as a hard scale on the inside of evaporators in which commercial crystalline aluminum hydrates are prepared. "Peptized alumina gel" is prepared from hydrous aluminum oxide precipitates in accordance with the method described in my U. S. Patent 1,976,875, issued October 16, 1934. These and possible other special forms of aluminum oxide have the desirable adsorptive and catalytic properties but many other forms of aluminum oxide particularly the cheap commercial aluminum hydrates are of little value for use as contact agents.

I have now found that a highly adsorptive and catalytically active alumina may be prepared from ordinary commercial aluminum hydrates by a relatively simple and inexpensive process. There are three hydrates of aluminum, the monohydrate ($Al_2O_3.H_2O$), the dihydrate ($Al_2O_3.2H_2O$) and the trihydrate ($Al_2O_3.3H_2O$). The commonest one is the trihydrate and it is obtained as a by-product in many industrial processes such as, for example, the refining of chromium from its ores. In addition to being available in larger quantities than activated alumina and other forms of alumina, the aluminum hydrates are very much cheaper, costing from 3 to 5 cents a pound as compared to 15 to 20 cents a pound for activated alumina.

It is therefore a principal object of the present invention to prepare highly adsorbent and catalytically active aluminas from cheap commercial aluminum hydrates.

The preferred method by which this is done is as follows:

The aluminum hydrate, which may be in powdered or lump form, is first moistened with an acid, preferably an organic acid, which is capable of bringing about a peptization or partial peptization of alumina. Among such acids may be mentioned trichloracetic acid, dichloracetic acid, monochloracetic acid, formic acid, acetic acid, oxalic acid and tartaric acid. Inorganic acids may be used in some cases but they are generally not as suitable as the organic acids. Acetic acid, either dilute or glacial, is generally the most convenient acid to use because it is the most readily available and does not involve the introduction of substances which might have a deleterious effect on the alumina. When dilute acetic acid is used the aluminum hydrate is moistened with from 2 to about 10% by weight of acetic acid solution. The moistened mass is allowed to digest for a period of time, say ½ to 2 hours, and it is then dried slowly at a relatively low temperature, say about 200–300° F. Thereafter the dried mass is activated by heating to a high temperature, in order to drive off volatile matter. It is held at this temperature until the volatile content as determined at 1600° F. has been reduced to the desired level. The extent to which the volatile content is reduced depends primarily on the use to which the alumina is to be put. For general adsorption purposes such as dehydration, etc., activation by heating to about 800° F. is usually sufficient while for catalyst or catalyst-carrier purposes, an activation temperature of 1000–1400° F. is preferred.

Another method of preparing the highly adsorptive and catalytically active alumina from the aluminum hydrate is to cover the hydrate either in powdered or lump form with an acetic acid solution, heat or digest while warm with or without pressure, drain off the solution and then slowly dry at low temperature and activate at high temperature in the manner described above.

The activated material can be prepared in any suitable form, i. e. powdered or in lump form, depending upon the use to which it is to be put.

In order to prepare catalysts for use in catalytic processes of treating hydrocarbon oils, such as catalytic reforming, catalytic dehydrogenation, catalytic cracking, hydrogenation, destructive hydrogenation, catalytic cracking or catalytic reforming in the presence of substantial quantities of added or recirculated hydrogen, the alumina prepared in the manner described may be mixed with oxides of other metals such as those of the III, IV, V, VI and VIII groups of the periodic system or it may be impregnated with solutions of soluble salts of those other metals and the impregnated mass ignited to convert the salt to the oxide. The quantity of other metal oxide associated with or impregnated upon the alumina may of course vary over wide limits, say from 1 to 50% by weight, and the particular metal oxide or oxides used will of course be determined by the particular process for which the catalyst is intended.

Although the foregoing description has been concerned entirely with the preparation of highly adsorptive and catalytically active contact agents from aluminum hydrates, it will be understood that the method is equally applicable to the preparation of highly adsorptive and catalytically active contact agents from hydrates of other amphoteric metals such as chromium and iron.

The following examples show a comparison between catalysts prepared from plain aluminum hydrate on the one hand, and peptized aluminum hydrate on the other, when used for catalytic cracking:

Example 1

Two catalysts are prepared, one from plain aluminum hydrate and the other from aluminum hydrate peptized with 5% acetic acid. Each is impregnated by first moistening with a solution of fluosilicic acid so that the finished catalysts contain 10% $SiO_2$.

Each catalyst is used for the catalytic cracking of an East Texas gas oil of about 33° A. P. I. gravity at a temperature of 850° F., under substantially atmospheric pressure and with a space velocity of 0.6 volume of liquid oil per volume of catalyst per hour. The length of the cracking portion of the cycle is two hours. Following are the results obtained:

| Catalyst | Cycle | Liquid product | | | Rejected gas, liters/100 gms. of liquid product |
|---|---|---|---|---|---|
| | | Gravity, °A. P. I. | Percent @400° F. | D+L@ 400° F. | |
| Plain Aluminum Hydrate | 1 | 44.9 | 37.5 | 42.0 | 9.1 |
| | 2 | 44.3 | 34.0 | 39.0 | 9.0 |
| | 3 | 42.6 | 32.5 | 36.5 | 9.1 |
| | 4 | 39.1 | 24.0 | 25.5 | 8.8 |
| Peptized Aluminum Hydrate | 1 | 45.8 | 42.0 | 49.0 | 12.4 |
| | 2 | 46.6 | 43.0 | 48.5 | 12.9 |
| | 3 | 43.5 | 37.0 | 41.0 | 13.1 |
| | 4 | 42.7 | 36.0 | 38.5 | 12.9 |

It will be observed that the yield of liquid product boiling in the gasoline range produced when the peptized aluminum hydrate catalyst is used is substantially greater than that obtained when the plain aluminum hydrate catalyst is used.

Example 2

Two catalysts are prepared in the same manner as outlined in Example 1 except that each is impregnated by first wetting with a solution of $B_2O_3$ so that the finished catalysts contain 15% $B_2O_3$. The impregnated catalysts are dried and activated at 900–1000° F.

Each catalyst is then used for the catalytic cracking of an East Texas gas oil under essentially the same conditions as in Example 1. Following are the results obtained:

| Catalyst | Cycle | Liquid product | | | Rejected gas, liters/100 gms. of liquid product |
|---|---|---|---|---|---|
| | | Gravity, °A. P. I. | Percent @400° F. | D+L@ 400° F. | |
| Plain Aluminum Hydrate | 1 | 39.1 | 30.0 | 30.5 | 16.7 |
| | 2 | 38.9 | 28.0 | 28.5 | 18.9 |
| Peptized Aluminum Hydrate | 1 | 45.7 | 40.5 | 44.0 | 10.6 |
| | 2 | 45.3 | 41.0 | 45.0 | 11.8 |

Here again it will be observed that the yield of liquid product boiling in the gasoline range is substantially greater with the peptized aluminum hydrate catalyst than with the plain aluminum hydrate catalyst.

This invention is not limited by any theories of the mechanism of the reactions nor by any details which have been given merely for purposes of illustration but is limited only in and by the following claims in which it is intended to claim all novelty inherent in the invention.

I claim:

1. The method of preparing a highly adsorbent, catalytically active oxide of an amphoteric metal which comprises moistening an initially dry hydrate of said metal with an acid capable of peptizing said hydrate, the amount of acid used being insufficient to form a sol, allowing the moistened mass to digest, slowly drying the peptized mass and then heating the dried mass to a temperature of about 1200° F. until the volatile content as determined at 1600° F. has been substantially reduced.

2. Method according to claim 1 in which the acid with which the hydrate is moistened is an organic acid.

3. Method according to claim 1 in which the acid with which the hydrate is moistened is acetic acid.

4. The method of preparing a highly adsorbent, catalytically active oxide of aluminum from an initially dry hydrate of aluminum which comprises moistening the initially dry hydrate with acetic acid, the amount of acid used being insufficient to form a sol, allowing the moistened mass to digest for a short period of time, slowly drying the digested mass, and then heating the dried mass at a temperature of about 1200° F. until the volatile content as determined at 1600° F. has been substantially reduced.

5. Method according to claim 4 in which the initially dry hydrate of aluminum is moistened with from 2 to about 10% by weight of an acetic acid solution.

6. The method of preparing a catalyst for use in catalytic processes of treating hydrocarbon oils which comprises moistening an initially dry hydrate of aluminum with an acid capable of peptizing said hydrate, the amount of acid being insufficient to form a sol, slowly drying the moistened mass, heating the dried mass to a temperature of 1200° F. until the volatile content as determined at 1600° F. has been substantially reduced and then incorporating with the heated mass so obtained an oxide of a metal other than aluminum selected from those in the III, IV, V, VI or VIII groups of the periodic system.

7. The method of preparing a highly adsorbent, catalytically active oxide of an amphoteric metal which comprises moistening an initially dry hydrate of said metal with an acid capable of peptizing said hydrate, the amount of acid being insufficient to form a sol, drying and heating the peptized mass until the volatile content has been substantially reduced.

8. Method according to claim 4 in which the hydrate of aluminum is the trihydrate.

GERALD C. CONNOLLY.